United States Patent
Schnier et al.

(10) Patent No.: US 7,236,857 B2
(45) Date of Patent: Jun. 26, 2007

(54) METHOD AND DEVICE FOR THE DISPLAY OF INFORMATION

(75) Inventors: Carsten Schnier, Salzgitter (DE); Stefan Lux, Sickte (DE); Doerte Falk, Braunschweig (DE); Rolf Feldmann, Porta Westfalica (DE); Uwe Heidemann, Altenbeken (DE)

(73) Assignees: Volkswagen AG, Wolfsburg (DE); ESC Electronic System Concepts GmbH, Grosswallstadt (DE)

( * ) Notice: Subject to any disclaimer, the term of this patent is extended or adjusted under 35 U.S.C. 154(b) by 583 days.

(21) Appl. No.: 10/433,521

(22) PCT Filed: Nov. 27, 2001

(86) PCT No.: PCT/EP01/13803
§ 371 (c)(1),
(2), (4) Date: Nov. 24, 2003

(87) PCT Pub. No.: WO02/055336
PCT Pub. Date: Jul. 18, 2002

(65) Prior Publication Data
US 2004/0083032 A1    Apr. 29, 2004

(30) Foreign Application Priority Data
Dec. 2, 2000  (DE) ............................. 100 60 008
Nov. 21, 2001 (DE) ............................. 101 56 912

(51) Int. Cl.
*G05D 1/00*  (2006.01)

(52) U.S. Cl. ..................... 701/1; 701/36; 701/208

(58) Field of Classification Search ........ 701/200–213, 701/1, 36, 300, 301; 340/988–995; 345/149, 345/326, 357; 379/88.17, 900
See application file for complete search history.

(56) References Cited

U.S. PATENT DOCUMENTS

| | | | |
|---|---|---|---|
| 5,610,821 A * | 3/1997 | Gazis et al. ............. 455/456.5 |
| 5,724,316 A * | 3/1998 | Brunts ........................ 368/10 |
| 6,138,072 A | 10/2000 | Nagai |
| 6,334,088 B1 * | 12/2001 | Taniguchi et al. .......... 701/208 |
| 6,336,072 B1 * | 1/2002 | Takayama et al. .......... 701/200 |
| 6,473,790 B1 * | 10/2002 | Tagi ........................... 709/216 |
| 6,643,581 B2 * | 11/2003 | Ooishi ........................ 701/207 |
| 2002/0075511 A1 | 6/2002 | Lorne |
| 2004/0019417 A1 | 1/2004 | Yasui et al. |

FOREIGN PATENT DOCUMENTS

| | | |
|---|---|---|
| EP | 0 795 433 | 9/1997 |
| FR | 2 793 935 | 11/2000 |
| JP | 2000-322694 | 11/2000 |
| JP | 2001-071787 | 3/2001 |
| WO | WO 99/05616 | 2/1999 |
| WO | WO 00/41090 | 7/2000 |

* cited by examiner

*Primary Examiner*—Richard M. Camby
(74) *Attorney, Agent, or Firm*—Kenyon & Kenyon LLP

(57) ABSTRACT

In a method for the display of optical information in an application with a display in a motor vehicle, the information is available in a given format. The information format is changed by a data processing process based on control information. The information is displayed in a changed format on the application page.

30 Claims, 1 Drawing Sheet

METHOD AND DEVICE FOR THE DISPLAY OF INFORMATION

FIELD OF THE INVENTION

The present invention relates to a method for displaying information, in particular optical information, on a display in a motor vehicle and to a device for implementing the method.

BACKGROUND INFORMATION

In today's motor vehicles, there are a multiplicity of components which transmit information to the driver and which generate acoustical and optical signals, potentially distracting the driver and diverting his/her concentration from the road traffic. Besides the classic car radio where the driver can listen to traffic news, these include, for example, navigational systems having optical and acoustical route guidance, mobile telephones provided with hands-free kits, i.e., car phones, and multifunctional display units having changing graphical interfaces. For that reason, to display city maps, road maps, routes, and other optical information, a motor vehicle is provided with a color display of an appropriate size for displaying television and video images.

The Internet and intranet have become important instruments for quickly acquiring information and for using services. However, difficulties arise when displaying information from the net, i.e., from web sites, in motor vehicles, due to ergonomic reasons, since, for example, brightly illuminated video displays can produce glare for the driver during nighttime driving. However, Internet web sites are always displayed with the coloration predefined by the web site provider. This can result in the legibility and display of web sites not being compatible with some applications. This is because, at the present time, the colors of web sites are not adaptable, without running the risk that adapting another web site using the same method results in this web site no longer being readable, for example, because the text and background color are suddenly identical or similar, so that no contrast at all or only a very poor contrast is achieved.

For that reason, it is an object of the present invention to display information from the Internet or intranet on a motor vehicle display that may enable the driver to take in the information with the greatest possible certainty.

SUMMARY

This objective may be achieved by providing a method and by providing a device as set forth herein. Example embodiments of the present invention are described herein.

In the method according to an example embodiment of the present invention for displaying optical information in an application on a display in a motor vehicle, the information existing in a predefined design, the design or layout form of the information is modified by a data-processing process in dependence upon control information and is displayed in a modified design on the application side.

The information may include a web site which is transmitted via a communications connection by the data-processing process on a web server for application purposes, to the motor vehicle. To modify or adapt the web site or the optical information, the control information is transmitted by the application to the data-processing process. The control information includes, in particular, information on the present situation or state of the motor vehicle. In this context, the concept of a motor-vehicle situation is described by a number of parameters, such as motor vehicle velocity, cornering speed, curve curvature, road condition, traffic density, driving situation, acceleration or deceleration, position, angle of inclination, ambient brightness, ambient temperature, and weather, etc.

The web site design modified by the data-processing process may be altered in terms of its content, layout, font size, coloration, and/or single or multiple image sections, etc.

The coloration may be changed, and this may be done with respect to one or more of the parameters color, color shade, color saturation, and brightness.

In addition, the background color and/or background design of the information or web site and/or the font color or font colors may be changed.

To transmit the control information, cookies, as well as meta tags in the http request may be used, or an appropriate parameter list is appended to the URL. It is also possible that the change in the color of a web site is derived from a meta tag instruction located in the web site's source code.

The control information may be generated, for example, from a manual input event and/or from the values of one or a plurality of transducers or sensors.

A device for implementing the method according to an example embodiment of the present invention has a display, a control unit, a communications device for connecting, for example, to the Internet, and sensors and/or transducers for determining the motor-vehicle situation.

One example embodiment of the present invention is described in the following on the basis of a drawing which schematically represents a device for implementing the method according to the present invention.

BRIEF DESCRIPTION OF THE DRAWING

The FIGURE is a schematic view of an example embodiment of a device for implementing an example embodiment of a method according to the present invention.

DETAILED DESCRIPTION

Figure 1:
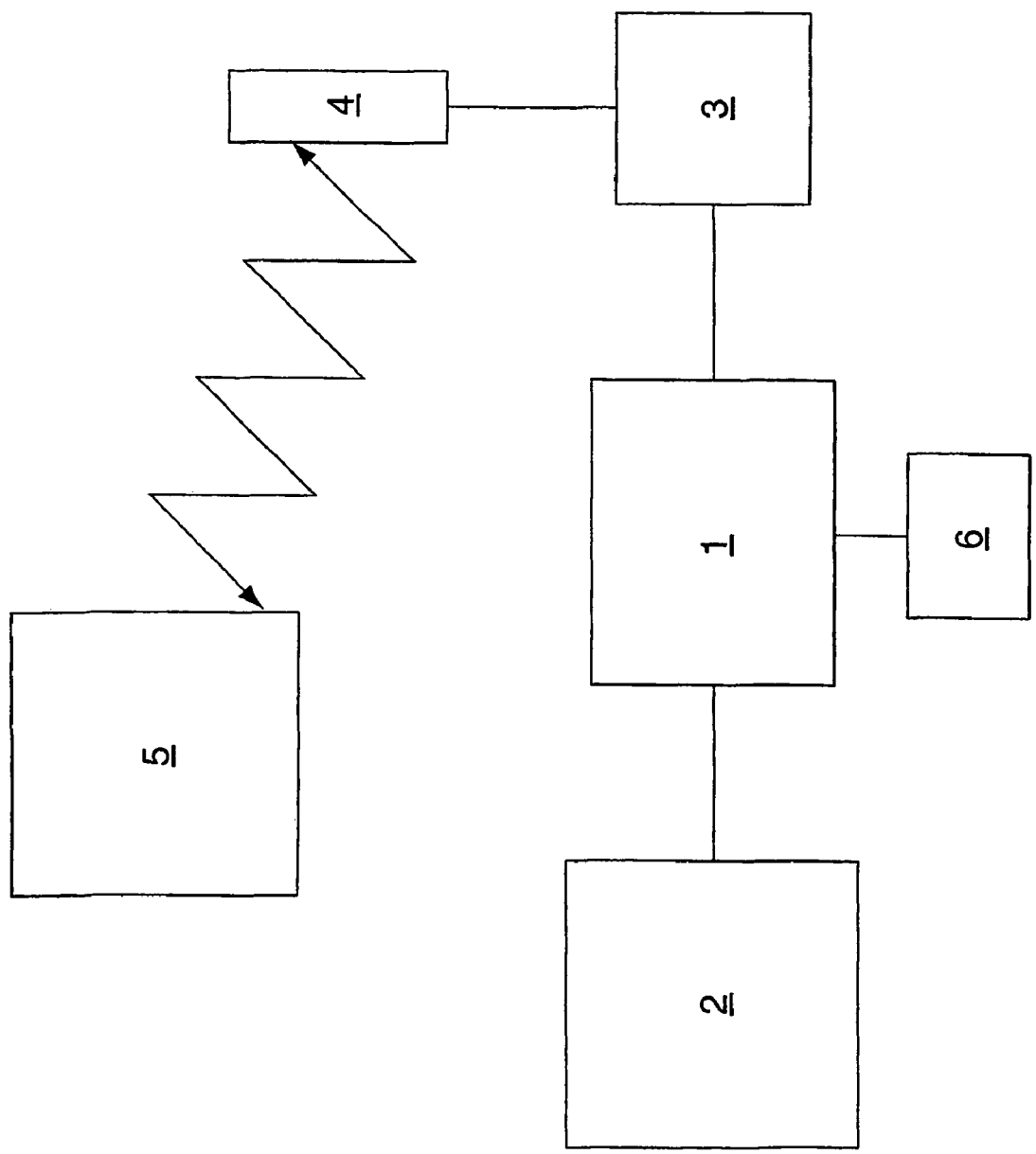

The FIGURE illustrates a control 1 having a display 2 connected thereto. Control 1 is linked to an Internet module 3 on which an application is executed, Internet module 3 being inscribed or entered in a mobile communications network via a mobile station 4 having an appropriate antenna and communicating with a data-processing process on a web server 5. In addition, control 1 is linked to various sensors and transducers, which are designated here, as a group, by reference numeral 6.

The method according to an example embodiment of the present invention may enable, in particular, the web sites to be adaptable for an application where the external appearance with respect to brightness and coloration is important, so that, for the most part, color adaptation will be discussed in the following. Other design elements, such as font size, layout, etc., of the web site are modifiable using the method, with the application of appropriate parameters of the motor-vehicle situation.

When web sites are called up, a communications connection exists between a data-processing process (in short DPP) on the web server and the application. This communications path may be used by the application to inform the DPP on the basis of control information that a different coloration is desired for a web site. On the basis of this control information, the DPP may generate a different coloration of the web site that is appropriate for the situation and may make this available to the application. The prerequisite for this is that such a method be supported by the DPP. The communications method may be implemented, for example, a) with parameters which are appended to the web address (URL), b) with so-called cookies, c) with meta tags on the web site, or d) with a meta tag extension in the http request.

In case a), the DPP on the web server may derive the control information from the parameters appended to the URL and generate and transmit the web site directly, when called up, in the coloration required by the application.

In case b), when the web site is first called up, the DPP on the web server transmits to the application. During an existing communications connection with the application, the DPP is able, with the aid of the cookie, to query the necessary control information from the application and, as a result, may generate and transmit web sites with the appropriate coloration.

In case c), there is an additional meta tag in the source code of the web site. On the basis of this meta tag, the application may simultaneously recognize if the web site supports a mechanism for color adaptation, as described here. Supplementing this information, a web address is then specified in the meta tag, which leads to an alternative web site having a different coloration and which is automatically called up, for example. In this manner, using the control information, which is generated in an application depending on the circumstances in the application environment, a web site that is already in the display device may be updated in the color display.

Case d) may be similar to case a), it being possible in this case for the DPP on the web server to derive the control information from the meta tags of the http request.

The methods delineated here are compatible with the web technologies employed today and may be used without conflicts arising with browsers or web sites which do not support these methods.

The simplest application case may be a request by the application for a bright or dark web site. In a further example embodiment of this method, the control information may contain values for ambient brightness. These may be used by the DPP on the web server to perfectly adjust the brightness or coloration of the web site to the circumstances of the application. In this context, the ambient brightness may be measured by a light sensor situated in the periphery of the application.

A color adaptation of this kind may also be implemented via a separate web service which is provided in the Internet or which is executed as a web service directly in the application. The objective of such a web service is to offer and run through this color adaptation as a central DPP. An advantage may be that not every web site existing in the Internet need consider this functionality, but, nevertheless, with the aid of this central web service, a color adaptation of each web site may be possible.

Color-adapted web sites of this kind on the web server may be produced using dynamic web-site generation in a DPP on a web server. This means a web server may not need to hold an appropriate web site in readiness for every possible color combination, but rather may generate the site universally for the particular web site query. For this, a calculation program for determining colors may be used, or, in the simplest case, the DPP may support two fixed color variants, for example, for day and night displays.

In a motor vehicle, during the day, in particular due to exposure to sunlight, a very bright, high-contrast coloration may be desired and, at night, an extremely low brightness with dark colors and surfaces may be required. By using the described method, it may be possible to solve these problems when displaying web sites in the vehicle. The vehicle may, for example, transmit the light switch position or the measured value of a light sensor in the vehicle to the DPP and thereby supply the required control information for day or night operation, whereupon the DPP generates the web site in the appropriate color representation. In addition, the DPP may adapt the coloration depending on the clock time, optionally in consideration of the vehicle's position as well. On the basis of this information and the seasonal light conditions, an automatic adaptation of the color display may be possible. Since the Internet having mobile data access in the vehicle has established its importance for route planning, traffic messages, and off-board navigation, a color adaptation of a web site may represent a practical expansion of functionality for the driver of a motor vehicle.

| Reference Symbol List | |
|---|---|
| 1 | control |
| 2 | display |
| 3 | Internet module |
| 4 | mobile station |
| 5 | web server |
| 6 | sensors and transducers |

What is claimed is:

1. A method for displaying optical information in an application in which a display is arranged in a motor vehicle, comprising:
   modifying a predefined arrangement of the information by a data-processing process in accordance with control information; and
   displaying the arrangement of the information in a modified arrangement on an application side.

2. The method according to claim 1, wherein the information includes a web site transmitted via a communications connection by the data-processing process on a web server to an application.

3. The method according to claim 1, further comprising transmitting the control information to the data-processing process by an application.

4. The method according to claim 1, wherein the control information includes information relating to a situation of the motor vehicle.

5. The method according to claim 4, wherein the situation of the motor vehicle includes at least one of a motor vehicle velocity, a cornering speed, a curve curvature, a road condition, a traffic density, a driving situation, an acceleration, a deceleration, a position, an angle of inclination, an ambient brightness, an ambient temperature, and weather.

6. The method according to claim 1, wherein the arrangement is modified in the modifying step with respect to at least one of content, layout, font size, coloration, single image sections and multiple image sections.

7. The method according to claim 6, wherein the modifying step includes changing coloration with respect to at least one color parameter.

8. The method according to claim 7, wherein the at least one color parameter includes at least one of color, color shade, color saturation and brightness.

9. The method according to claim 6, wherein the modifying step includes changing at least one of a background color and a background design of the information.

10. The method according to claim 7, wherein the modifying step includes changing at least one of at least one font color.

11. The method according to claim 3, wherein the control information is transmitted in the transmitting step in accordance with a cookie.

12. A method for displaying optical information in an application in which a display is arranged in a motor vehicle, the information existing in a predefined arrangement, comprising:
modifying the arrangement of the information by a data-processing process in accordance with control information;
displaying the arrangement of the information in a modified arrangement on an application side; and
transmitting the control information to the data-processing process by an application;
wherein the control information is transmitted in the transmitting step in accordance with a meta tag in an http request.

13. The method according to claim 3, wherein the control information transmitting step includes appending a parameter list to a URL.

14. A method for displaying optical information in an application in which a display is arranged in a motor vehicle, the information existing in a predefined arrangement, comprising:
modifying the arrangement of the information by a data-processing process in accordance with control information:
displaying the arrangement of the information in a modified arrangement on an application side, wherein the arrangement is modified in the modifying step with respect to at least one of content, layout, font size, coloration, single image sections and multiple image sections; and
deriving a change of color of a web site from a meta tag instruction located in a source code of the web site.

15. The method according to claim 1, further comprising generating the control information from at least one of a manual input event and from values of at least one transducer.

16. A device, comprising:
a display arranged in a motor vehicle;
a control unit;
a communications device;
at least one of at least one sensor and at least one transducer configured to determine a motor vehicle situation; and
an arrangement configured to perform a method for displaying optical information in an application, the method including:
modifying a predefined arrangement of the information by a data-processing process in accordance with control information; and
displaying the arrangement of the information in a modified arrangement on an application side.

17. The device according to claim 16, wherein the information includes a web site transmitted via a communications connection by the data-processing process on a web server to an application.

18. The device according to claim 16, wherein the method further includes transmitting the control information to the data-processing process by an application.

19. The device according to claim 16, wherein the control information includes information relating to a situation of the motor vehicle.

20. The device according to claim 19, wherein the situation of the motor vehicle includes at least one of a motor vehicle velocity, a cornering speed, a curve curvature, a road condition, a traffic density, a driving situation, an acceleration, a deceleration, a position, an angle of inclination, an ambient brightness, an ambient temperature, and weather.

21. The device according to claim 16, wherein the arrangement is modified in the modifying step with respect to at least one of content, layout, font size, coloration, single image sections and multiple image sections.

22. The device according to claim 21, wherein the modifying step includes changing coloration with respect to at least one color parameter.

23. The device according to claim 22, wherein the at least one color parameter includes at least one of color, color shade, color saturation and brightness.

24. The device according to claim 21, wherein the modifying step includes changing at least one of a background color and a background design of the information.

25. The device according to claim 22, wherein the modifying step includes changing at least one of at least one font color.

26. The device according to claim 18, wherein the control information is transmitted in the transmitting step in accordance with a cookie.

27. A device, comprising:
a display arranged in a motor vehicle;
a control unit;
a communications device;
at least one of at least one sensor and at least one transducer configured to determine a motor vehicle situation; and
an arrangement configured to perform a method for displaying optical information in an application, the information existing in a predefined arrangement, the method including:
modifying the arrangement of the information by a data-processing process in accordance with control information; and
displaying the arrangement of the information in a modified arrangement on an application side, wherein the method further includes transmitting the control information to the data-processing process by an application;
wherein the control information is transmitted in the transmitting step in accordance with a meta tag in an http request.

28. The device according to claim 18, wherein the control information transmitting step includes appending a parameter list to a URL.

29. A device, comprising:
a display arranged in a motor vehicle;
a control unit;
a communications device;
at least one of at least one sensor and at least one transducer configured to determine a motor vehicle situation;
an arrangement configured to perform a method for displaying optical information in an application, the information existing in a predefined arrangement, the method including:
modifying the arrangement of the information by a data-processing process in accordance with control information; and
displaying the arrangement of the information in a modified arrangement on an application side, wherein the arrangement is modified in the modifying step with respect to at least one of content, layout, font size, coloration, single image sections and multiple image sections;
wherein the method further includes deriving a change of color of a web site from a meta tag instruction located in a source code of the web site.

30. The device according to claim 16, wherein the method further includes generating the control information from at least one of a manual input event and from values of at least one transducer.

* * * * *